(12) United States Patent
Ishige

(10) Patent No.: US 9,022,449 B2
(45) Date of Patent: May 5, 2015

(54) STRADDLE-TYPE VEHICLE SEAT AND STRADDLE-TYPE VEHICLE

(71) Applicant: Showa Corporation, Gyoda-shi (JP)

(72) Inventor: Shingo Ishige, Haga-gun (JP)

(73) Assignee: Showa Corporation, Gyoda-Shi (JP)

( * ) Notice: Subject to any disclaimer, the term of this patent is extended or adjusted under 35 U.S.C. 154(b) by 0 days.

(21) Appl. No.: 14/224,564

(22) Filed: Mar. 25, 2014

(65) Prior Publication Data
US 2015/0061312 A1     Mar. 5, 2015

(30) Foreign Application Priority Data
Sep. 3, 2013   (JP) ................................. 2013-182417

(51) Int. Cl.
| | |
|---|---|
| B60N 2/02 | (2006.01) |
| B60N 2/39 | (2006.01) |
| B62D 61/06 | (2006.01) |
| B62D 63/04 | (2006.01) |
| B60N 2/40 | (2006.01) |
| B60N 2/10 | (2006.01) |

(52) U.S. Cl.
CPC *B60N 2/39* (2013.01); *B62D 61/06* (2013.01); *B62D 63/04* (2013.01); *B60N 2/40* (2013.01); *B60N 2/10* (2013.01)

(58) Field of Classification Search
USPC ....................................... 296/65.01; 297/311
See application file for complete search history.

(56) References Cited

U.S. PATENT DOCUMENTS

| | | | | | |
|---|---|---|---|---|---|
| 4,988,300 | A | * | 1/1991 | Yamaguchi et al. | 434/247 |
| 6,074,002 | A | * | 6/2000 | Hansen | 297/201 |
| 6,139,098 | A | * | 10/2000 | Carrillo | 297/202 |
| 7,516,998 | B1 | * | 4/2009 | Berg et al. | 296/65.01 |
| 2007/0034435 | A1 | * | 2/2007 | Berg et al. | 180/190 |

FOREIGN PATENT DOCUMENTS

| | | | |
|---|---|---|---|
| JP | 2005 161911 A | * | 6/2005 |
| JP | 2008-68818 A | | 3/2008 |

* cited by examiner

*Primary Examiner* — Lori L Lyjak
(74) *Attorney, Agent, or Firm* — Leason Ellis LLP

(57) ABSTRACT

A straddle-type vehicle seat includes: a saddle-type seat main body which is provided above a vehicle body in one of a three-wheel straddle-type vehicle and a four-wheel straddle-type vehicle and which is straddled by a driver; and an angle adjustment mechanism which adjusts an angle of the saddle-type seat main body with respect to the vehicle body in accordance with a signal from a detection unit that detects a traveling state of the straddle-type vehicle when the straddle-type vehicle is turning.

7 Claims, 8 Drawing Sheets

STRADDLE-TYPE VEHICLE SEAT AND STRADDLE-TYPE VEHICLE

CROSS-REFERENCE TO RELATED APPLICATIONS

This application is based on and claims priority under 35 U.S.C. 119 from Japanese Patent Application No. 2013-182417 filed on Sep. 3, 2013, the entire content of which is incorporated herein by reference.

BACKGROUND

1. Technical Field

The present invention relates to a straddle-type vehicle seat and a straddle-type vehicle.

2. Related Art

An all terrain vehicle (ATV) is a vehicle for traveling on rough roads such as on sand or mud, and may also be referred to as a straddle-type vehicle, an all terrain traveling vehicle, a buggy, or the like. The ATV typically includes a pair of left and right front wheels and/or a pair of left and right rear wheels and is configured as a four-wheel or three-wheel straddle-type vehicle.

For example, a straddle-type vehicle described in Patent Literature 1 (JP-A-2008-68818) includes foot boards on which the feet of a rider are placed at lower parts of both left and right sides of a saddle-type seating seat that is straddled by the rider. In addition, footrests on which soles of the rider are rested are provided on the foot boards.

SUMMARY OF INVENTION

When a driver turns a straddle-type vehicle, since the straddle-type vehicle and its driver are subjected to centrifugal force, the driver must balance himself/herself against the centrifugal force. In other words, the driver must move his/her center of gravity by, for example, planting his/her outside foot with respect to a turning center on the foot board and inclining his/her upper body toward the turning center. Such a variation in a turning radius and the like of the straddle-type vehicle in accordance with a center-of-gravity position of the driver or, in other words, a posture of the driver enables the driver to enjoy steering of the straddle-type vehicle more actively.

However, such center-of-gravity movements by the driver require advanced operating techniques such as adjusting an amount of movement in accordance with turning speed. In addition, for example, a driver riding a straddle-type vehicle for the first time may experience fear of altering a posture on a traveling straddle-type vehicle in order to move his/her center of gravity.

An illustrative aspect of the present invention is to assist a vehicle operation by a driver to move his/her center of gravity when the driver turns the vehicle.

According to an aspect of the present invention, it provides a straddle-type vehicle seat including: a saddle-type seat main body which is provided above a vehicle body in one of a three-wheel straddle-type vehicle and a four-wheel straddle-type vehicle and which is straddled by a driver; and an angle adjustment mechanism which adjusts an angle of the saddle-type seat main body with respect to the vehicle body in accordance with a signal from a detection unit that detects a traveling state of the straddle-type vehicle when the straddle-type vehicle is turning.

In this case, the angle adjustment mechanism may adjust the angle of the saddle-type seat main body with respect to the vehicle body in accordance with an angle of a steering part steering the straddle-type vehicle and a speed of the straddle-type vehicle.

In addition, the angle adjustment mechanism may adjust the angle of the saddle-type seat main body with respect to the vehicle body so that, in the saddle-type seat main body, a side of a center of turning of the straddle-type vehicle becomes lower than an outer side of the center of turning.

Furthermore, the angle adjustment mechanism may incline the saddle-type seat main body in a direction opposite to a direction in which the vehicle body inclines when the straddle-type vehicle is turning.

In addition, the angle adjustment mechanism may include a plurality of height adjustment mechanisms which are disposed below the saddle-type seat main body, and which extend and compress with upper ends thereof being connected to the saddle-type seat main body and lower ends thereof being connected to the vehicle body, and which are provided at positions that differ from one another in a vehicle width direction of the straddle-type vehicle.

Furthermore, the angle adjustment mechanism may include a support part which is fixed to the vehicle body and which rotatably supports a center part of the saddle-type seat main body in a vehicle width direction of the straddle-type vehicle.

According to another aspect of the present invention, it provides a straddle-type vehicle including: a vehicle body for one of a three-wheel straddle-type vehicle and a four-wheel straddle-type vehicle; a saddle-type seat main body which is provided above the vehicle body and which is straddled by a driver; a detection sensor which detects a traveling state of the straddle-type vehicle when the vehicle is turning; and a position adjustment mechanism which adjusts a relative position of the saddle-type seat main body with respect to the vehicle body in accordance with a signal from the detection sensor.

According to any one of the configurations above, a vehicle operation by a driver to move his/her center of gravity when the driver turns the vehicle can be assisted.

DESCRIPTION OF EMBODIMENTS

Hereinafter, an embodiment of the present invention will be described in detail with reference to the attached drawings.
<Straddle-Type Vehicle 1>

Figure 1:
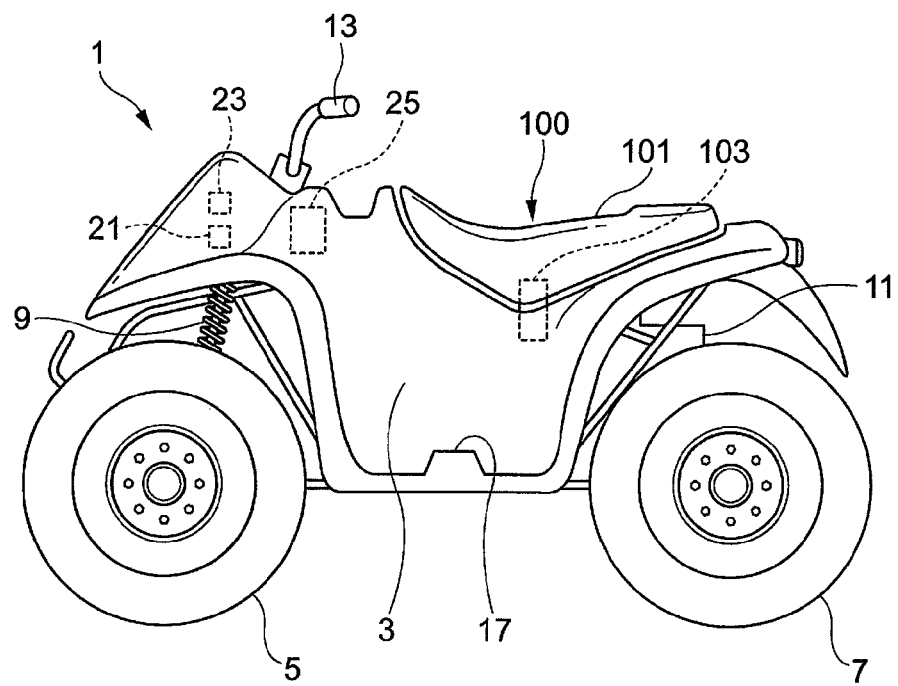
FIG. 1 is a diagram showing an overall configuration of a straddle-type vehicle according to a present embodiment.

FIG. 1 is a diagram showing an overall configuration of a straddle-type vehicle 1 according to a present embodiment.

The straddle-type vehicle 1 according to the present embodiment includes a vehicle body frame 3 that is an example of a vehicle body, respective left and right pairs of front wheels 5 and rear wheels 7 provided at the front and the rear of the vehicle body frame 3, and a front wheel suspension device 9 and a rear wheel suspension device 11 which are provided at the front and the rear of the vehicle body frame 3 and which respectively suspend the front wheels 5 and the rear wheels 7.

In addition, the straddle-type vehicle 1 includes a steering bar 13 for steering which is an example of a steering part and which is provided above the front wheels 5, a saddle-type seating seat 100 which is an example of a straddle-type vehicle seat, which is provided to the rear of the steering bar 13 and above the vehicle body frame 3, and which is straddled by a driver 50 (refer to FIG. 4), and a foot board 17 which is provided between the front wheels 5 and the rear wheels 7 and on which the feet of the driver 50 are placed. Furthermore, the straddle-type vehicle 1 includes an engine (not shown) which is provided at an approximately central position of the vehicle body frame 3 and which supplies a driving force to the front wheels 5 and the rear wheels 7, and a drive transmission device 19 (refer to FIG. 2) such as a propeller shaft which transmits the driving force from the engine to the front wheels 5 and the rear wheels 7.

In addition, the straddle-type vehicle 1 includes a steering angle sensor 21 which detects an angle (a steering angle) by which the driver 50 steers the steering bar 13 and which outputs a steering angle signal, a vehicle speed sensor 23 which detects a speed (a vehicle speed) of the straddle-type vehicle 1 and which outputs a vehicle speed signal, and a control device 25 (to be described later) which controls the seating seat 100 based on the detection signals (the steering angle signal and the vehicle speed signal) from the steering angle sensor 21 and the vehicle speed sensor 23. Moreover, the steering angle sensor 21 and the vehicle speed sensor 23 are examples of a detection unit and a detection sensor.

The front wheels 5 and the rear wheels 7 respectively have an approximately rectangular shape (refer to FIG. 2) when viewed from the front of the straddle-type vehicle 1. More specifically, the front wheels 5 and the rear wheels 7 are so-called balloon tires which are special tires with large width and low pressure. With the front wheels 5 and the rear wheels 7, irregularities of a road surface are absorbed by deformation of the low-pressure tires, and the large-width tires prevent sinking even when the road surface is soft.

In addition, in the illustrated example, the straddle-type vehicle 1 is configured without a differential device (a differential gear) that absorbs a difference in revolutions which is created between left and right drive wheels when the straddle-type vehicle 1 advances while turning left and right (during turning).

<Seating Seat 100>

Figure 2:
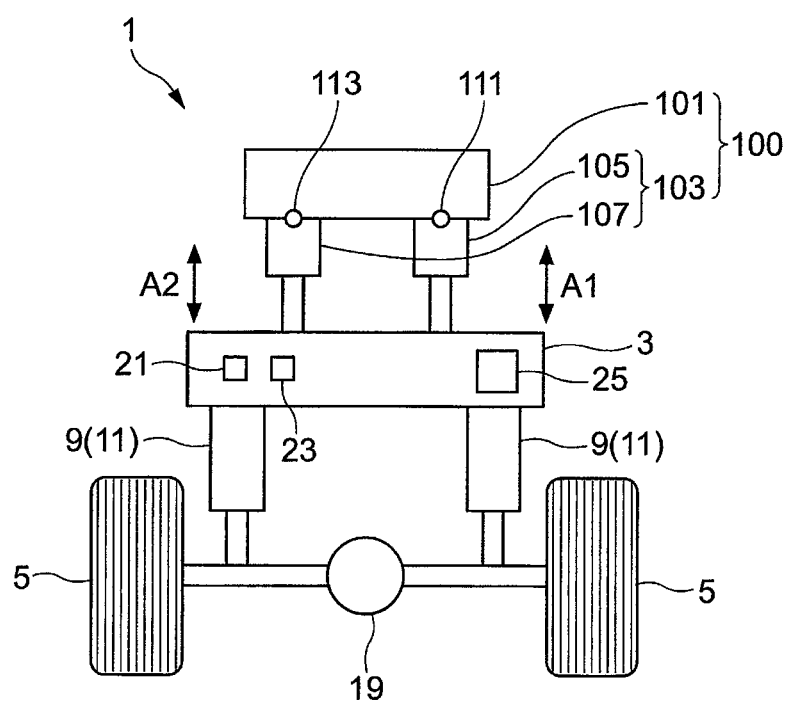
FIG. 2 is a diagram showing an overall configuration of a seating seat.

FIG. 2 is a diagram showing an overall configuration of the seating seat 100. Moreover, FIG. 2 is a conceptual diagram that presents the seating seat 100 and surrounding members thereof when viewed from the front of the straddle-type vehicle 1.

The seating seat 100 according to the present embodiment includes a seat main body 101 and an angle adjustment mechanism 103 which adjusts an angle of the seat main body 101 with respect to the vehicle body frame 3 while supporting the seat main body 101. Moreover, the angle adjustment mechanism 103 can be considered a position adjustment mechanism which adjusts a relative position of the seat main body 101 with respect to the vehicle body frame 3.

The seat main body 101 which is an example of the saddle-type seat main body constitutes a so-called saddle-type seat which is straddled by the driver 50.

The angle adjustment mechanism 103 includes a first hydraulic damper 105 and a second hydraulic damper 107 which are provided separated from one another in a vehicle width direction (a left-right direction in FIG. 2). The first hydraulic damper 105 and the second hydraulic damper 107 are respectively provided below the seat main body 101, and respectively have one end (an upper end part shown in FIG. 2) connected to the seat main body 101 and another end (a lower end part shown in FIG. 2) connected to the vehicle body frame 3.

Moreover, in the illustrated example, the first hydraulic damper 105 and the second hydraulic damper 107 include hinges 111 and 113 at their respective one ends (the upper end parts shown in FIG. 2). In addition, the first hydraulic damper 105 and the second hydraulic damper 107 are rotatably supported by the seat main body 101 via the hinges 111 and 113. Accordingly, angles of the first hydraulic damper 105 and the second hydraulic damper 107 with respect to the seat main body 101 are variable.

Furthermore, the first hydraulic damper 105 and the second hydraulic damper 107 respectively include hydraulic pumps (not shown). The first hydraulic damper 105 and the second hydraulic damper 107 are extendable and compressible by driving the respective hydraulic pumps and adjusting hydraulic pressure (refer to arrows A1 and A2 in FIG. 2). In addition, by respectively controlling the hydraulic pumps, extension/compression amounts (axial lengths) of the first hydraulic damper 105 and the second hydraulic damper 107 can be set so as to differ from one another.

<Control Device 25>

Figure 3:
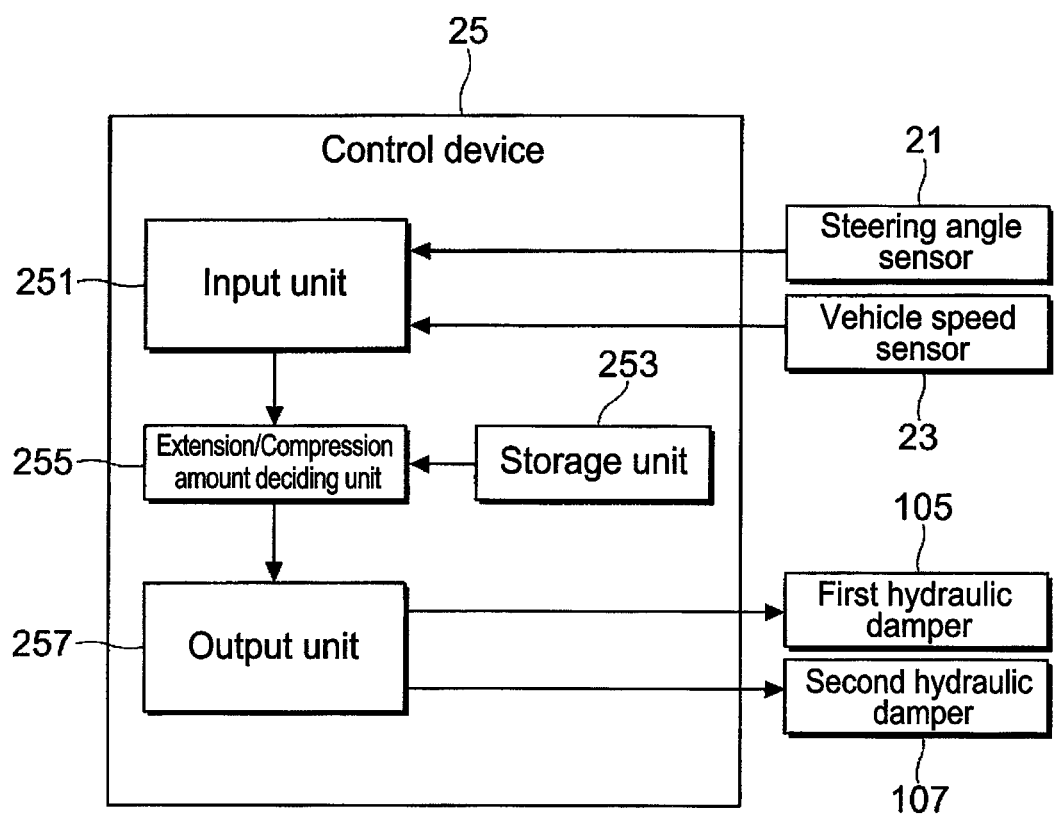
FIG. 3 is a block diagram showing a configuration of a control device.

FIG. 3 is a block diagram showing a configuration of the control device 25. The control device 25 includes a CPU (not shown) which performs arithmetic processing when controlling the first hydraulic damper 105 and the second hydraulic damper 107, a ROM (not shown) which stores programs executed by the CPU, various data, and the like, and a RAM (not shown) which is used as a working memory of the CPU and the like. The control device 25 is provided on the vehicle body frame 3 (refer to FIG. 2).

The control device 25 includes an input unit 251 which receives input of a steering angle signal from the steering angle sensor 21 and a vehicle speed signal from the vehicle speed sensor 23, a storage unit 253 which stores a table defining extension/compression amounts of the first hydraulic damper 105 and the second hydraulic damper 107, an extension/compression amount deciding unit 255 which decides extension/compression amounts of the first hydraulic damper 105 and the second hydraulic damper 107, and an output unit 257 which outputs a control signal to the first hydraulic damper 105 and the second hydraulic damper 107.

The storage unit 253 stores, in advance, a table that defines combinations of steering angles and vehicle speeds and extension/compression amounts of the first hydraulic damper 105 and the second hydraulic damper 107 for each combination.

In addition, the extension/compression amount deciding unit 255 decides (calculates) extension/compression amounts of the first hydraulic damper 105 and the second hydraulic damper 107 based on the steering angle signal and the vehicle speed signal received by the input unit 251 and on the table stored in the storage unit 253.

<Turning Operation of Straddle-Type Vehicle 1>

Figure 4:
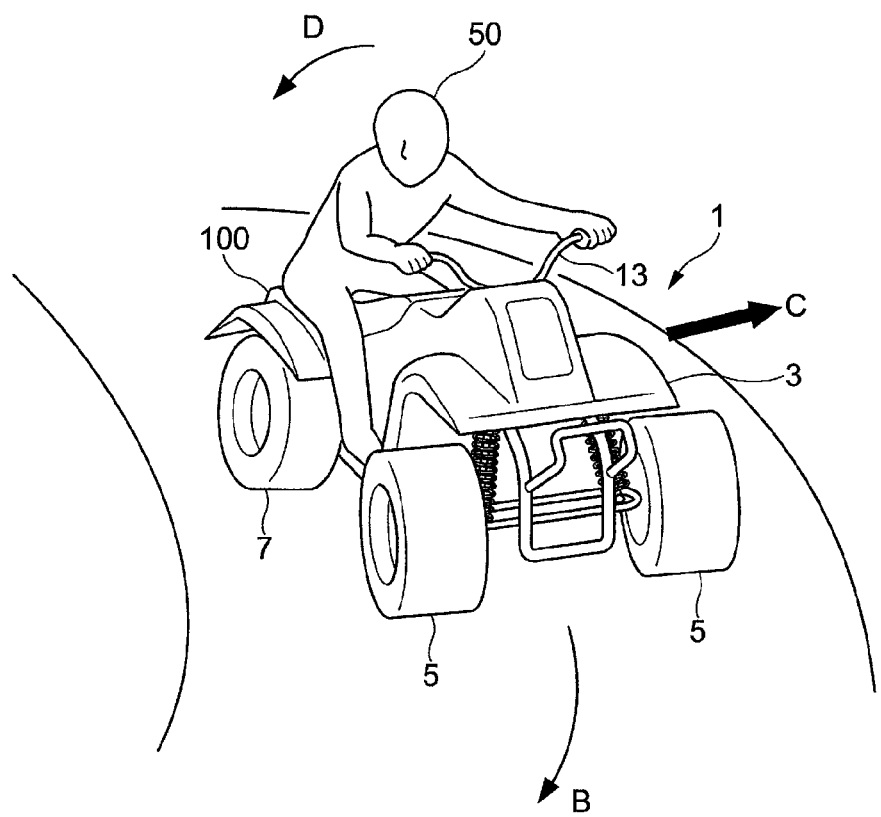
FIG. 4 is a diagram for explaining a straddle-type vehicle when the vehicle is turned.
Figure 5:
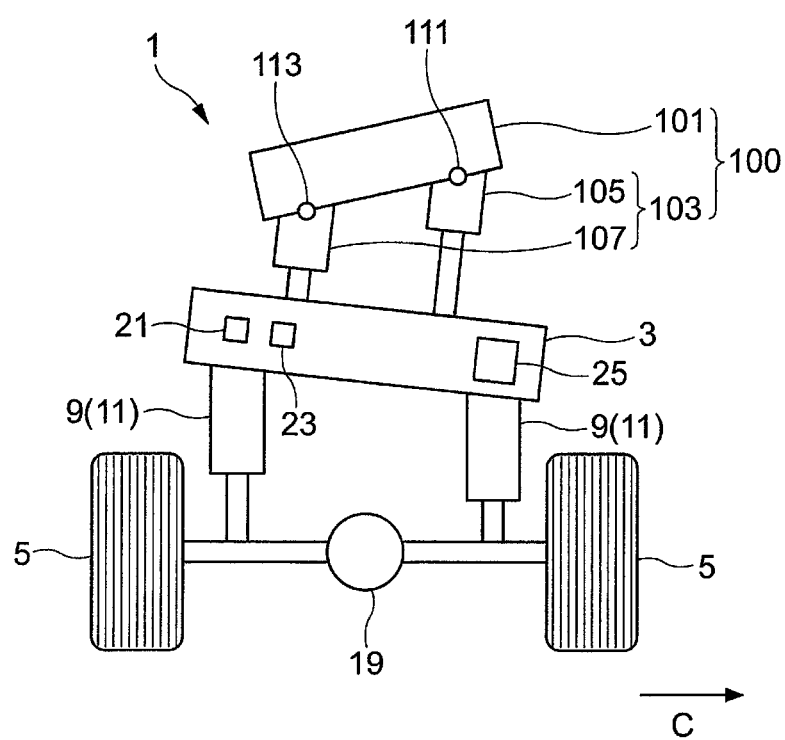
FIG. 5 is a diagram for explaining an operation of a seating seat when the vehicle is turned.

FIG. 4 is a diagram for explaining the straddle-type vehicle 1 when the vehicle is turned. FIG. 5 is a diagram for explaining an operation of the seating seat 100 when the vehicle is turned. Moreover, FIG. 5 is a conceptual diagram that presents the seating seat 100 and surrounding members thereof when viewed from the front of the straddle-type vehicle 1.

Next, an operation of the straddle-type vehicle 1 when the straddle-type vehicle 1 is turned will be described with reference to FIGS. 1 to 5.

First, the straddle-type vehicle 1 travels as a driving force of an engine (not shown) is transmitted to the front wheels 5 and the rear wheels 7 via the drive transmission device 19.

When the straddle-type vehicle 1 is traveling straight, as shown in FIG. 2, the vehicle body frame 3 and the seat main body 101 are generally not inclined in the vehicle width direction and are disposed in a horizontal direction. Hereinafter, a steering angle of the steering bar 13 when the straddle-type vehicle 1 is traveling straight will be referred to as a straight travel angle.

During driving of the engine (not shown), the control device 25 monitors the steering angle signal from the steering angle sensor 21 and the vehicle speed signal from the vehicle speed sensor 23.

In addition, as the driver 50 steers the steering bar 13 to the left or the right from the straight travel angle as shown in FIG. 4, the straddle-type vehicle 1 starts to turn (refer to arrow B in FIG. 4).

When the straddle-type vehicle 1 turns, the straddle-type vehicle 1 and the driver 50 are subjected to a centrifugal force. In other words, the straddle-type vehicle 1 and the driver 50 are subjected to a force in a direction (refer to arrow C in FIG. 4) from a turning center side toward an outer side of the turning center.

In addition, as shown in FIG. 5, when subjected to the centrifugal force, the vehicle body frame 3 inclines such that an outer side of the turning center (a right side in FIG. 5) becomes lower (sinks) in comparison to a turning center side (a left side in FIG. 5). In other words, the vehicle body frame 3 inclines toward the outer side of the turning center.

Meanwhile, when the control device 25 detects a variation in the steering angle of the steering bar 13 via the steering angle sensor 21, the control device 25 drives the angle adjustment mechanism 103. Accordingly, the seat main body 101 inclines such that the turning center side (the left side in FIG. 5) becomes lower (sinks) in comparison to the outer side of the turning center (the right side in FIG. 5). Otherwise stated, the seat main body 101 inclines in a direction that is opposite to the direction in which the vehicle body frame 3 inclines or, in other words, the seat main body 101 inclines toward the turning center side.

To describe the inclination of the seat main body 101 in greater detail, first, the input unit 251 of the control device 25 receives a steering angle signal and a vehicle speed signal at the start of turning by the straddle-type vehicle 1 from the steering angle sensor 21 and the vehicle speed sensor 23. Subsequently, the extension/compression amount deciding unit 255 decides extension/compression amounts of the first hydraulic damper 105 and the second hydraulic damper 107 based on the steering angle signal and the vehicle speed signal received by the input unit 251 and on the table stored in the storage unit 253.

Next, the output unit 257 outputs a control signal to the first hydraulic damper 105 and the second hydraulic damper 107 based on the decided extension/compression amounts. The first hydraulic damper 105 and the second hydraulic damper 107 having received the control signal extend/compress while driving their respective hydraulic pumps (not shown). In the example shown in FIG. 5, a length of the second hydraulic damper 107 that is positioned on the turning center side (the left side in FIG. 5) becomes shorter than that of the first hydraulic damper 105 that is positioned on the outer side of the turning center (the right side in FIG. 5).

Thereafter, due to driving by the first hydraulic damper 105 and the second hydraulic damper 107, the seat main body 101 falls toward the turning center side and, at the same time, a center of gravity of the driver 50 astride the seat main body 101 moves toward the turning center side (refer to arrow D in FIG. 4). Due to the seat main body 101 inclining and the center of gravity of the driver 50 moving in this manner, a force (a so-called turning force) is applied in a direction opposing the centrifugal force. As a result, turning of the straddle-type vehicle 1 takes place more smoothly due to a reduced turning radius of the straddle-type vehicle 1 and the like. In addition, the center of gravity of the driver 50 can be moved smoothly in accordance with the turning force.

Subsequently, as the steering angle of the steering bar 13 of the turning straddle-type vehicle 1 returns to the straight travel angle, the straddle-type vehicle 1 starts straight travel and, as shown in FIG. 2, the vehicle body frame 3 and the seat main body 101 are disposed in a horizontal direction.

As described earlier, as the straddle-type vehicle 1 is turned, the vehicle body frame 3 inclines as though falling toward the outer side of the turning center. The inclination of the vehicle body frame 3 requires that the driver 50 astride the seat main body 101 provided on the vehicle body frame 3 move his/her center of gravity by a greater amount in comparison to a case where the vehicle body frame 3 does not incline.

However, in the present embodiment, the inclination of the seat main body 101 by the angle adjustment mechanism 103 as described above makes it easier for the driver 50 to perform an operation for moving his/her center of gravity. More specifically, compared to a case where the angle adjustment mechanism 103 is not provided, since the angle adjustment mechanism 103 moves the center of gravity of the driver 50 in the present embodiment, the amount by which the driver 50 himself/herself must move his/her center of gravity is reduced or the need for the driver 50 to move his/her center of gravity is eliminated.

The centrifugal force that is applied to the straddle-type vehicle 1 and the driver 50 during a turn varies in accordance with a traveling state of the straddle-type vehicle 1 or, using the example described above, the steering angle and the vehicle speed of the straddle-type vehicle 1. Therefore, the table stored in the storage unit 253 as described earlier determines extension/compression amounts (axial lengths) of the first hydraulic damper 105 and the second hydraulic damper 107 so that the greater the steering angle, the greater the difference in axial lengths between the first hydraulic damper 105 and the second hydraulic damper 107. In addition, the extension/compression amounts (axial lengths) of the first hydraulic damper 105 and the second hydraulic damper 107 are determined so that the greater the vehicle speed, the greater the difference in lengths between the first hydraulic damper 105 and the second hydraulic damper 107.

Accordingly, the extension/compression amounts of the first hydraulic damper 105 and the second hydraulic damper 107 are adjusted in accordance with the centrifugal force that is applied to the straddle-type vehicle 1 and the driver 50 during turning.

Moreover, as shown in FIG. 5, when a turn is executed by the straddle-type vehicle 1, the front wheels 5 and the rear wheels 7 maintain their postures in which respective rotary shafts thereof are oriented along the road surface. In other words, the straddle-type vehicle 1 does not turn while inclining the rotary shafts of the wheels with respect to the road surface and bringing side surfaces of the wheels into contact with the road surface as is the case of, for example, a motorcycle that differs from the illustrated straddle-type vehicle 1.

<Modification 1>

FIGS. 6A, 6B, 6C, and 6D are diagrams for respectively explaining first to fourth modifications of the seating seat 100.

While a configuration in which the seating seat 100 includes the first hydraulic damper 105 and the second hydraulic damper 107 that are provided separated from one another in the vehicle width direction has been described as the angle adjustment mechanism 103 in the embodiment above, this configuration is not restrictive.

Figure 6A:
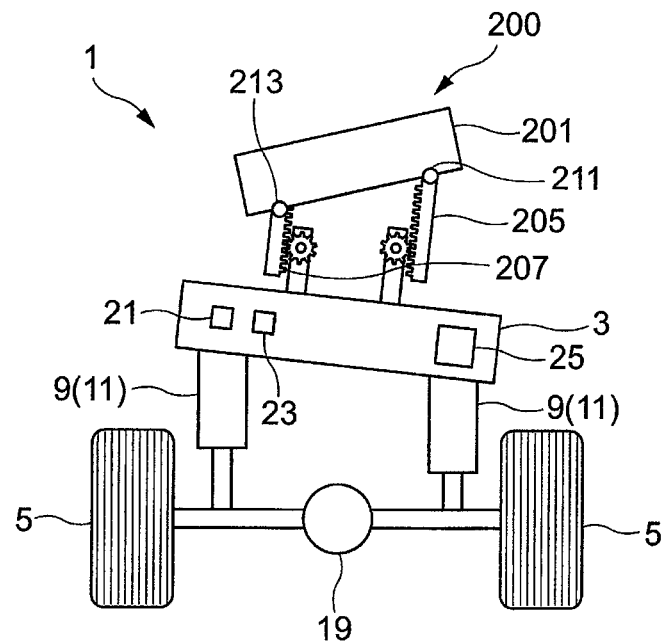
FIG. 6A is a diagram for explaining a first modification of a seating seat.

For example, in the first modification shown in FIG. 6A, a seating seat 200 includes a seat main body 201 and racks and pinions 205 and 207 which are provided separated from one another in the vehicle width direction and which respectively perform driving upon receiving a driving force from a motor (not shown). In addition, the racks and pinions 205 and 207 in the illustrated example respectively include hinges 211 and 213 at one of their ends (upper end parts in FIG. 6A).

In addition, with the seating seat 200, as the racks and pinions 205 and 207 respectively perform driving, the seat main body 201 inclines in the vehicle width direction.

In addition, in the second modification shown in FIG. 6B, a seating seat 300 includes a seat main body 301, a seat angle adjustment mechanism 303 having a first hydraulic damper 305 and a second hydraulic damper 307 which are provided separated from one another in the vehicle width direction, and a fulcrum 309 which constitutes an example of a support part and which rotatably supports the seat main body 301 in the vehicle width direction below the seat main body 301.

Figure 6B:
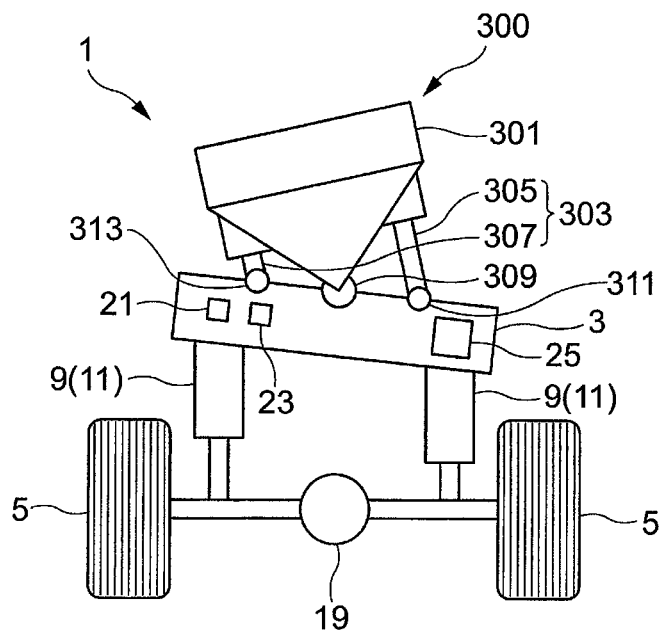
FIG. 6B is a diagram for explaining a second modification of a seating seat.

In the illustrated example, the first hydraulic damper 305 and the second hydraulic damper 307 include hinges 311 and 313 at their respective one ends (the lower end parts in FIG. 6B). In addition, the first hydraulic damper 305 and the second hydraulic damper 307 are rotatably supported by the vehicle body frame 3 via the hinges 311 and 313. Accordingly, angles of the first hydraulic damper 305 and the second hydraulic damper 307 with respect to the vehicle body frame 3 are variable.

Furthermore, the fulcrum 309 is provided at a center part of the seat main body 301 in the vehicle width direction and is fixed to the vehicle body frame 3.

With the seating seat 300, as the first hydraulic damper 305 and the second hydraulic damper 307 extend/compress, the seat main body 301 inclines in the vehicle width direction while rotating around the fulcrum 309.

In addition, in the third modification shown in FIG. 6C, a seating seat 400 includes a seat main body 401, springs 405 and 407 which are provided separated from one another in the vehicle width direction and whose respective one ends are connected to the seat main body 401 and respective other ends are connected to the vehicle body frame 3, a driven gear 409 which is provided below the seat main body 401 in a center part of the seat main body 401 in the vehicle width direction, and a drive gear 410 which is rotatably supported by the vehicle body frame 3 and which rotates due to driving by a motor (not shown).

Figure 6C:
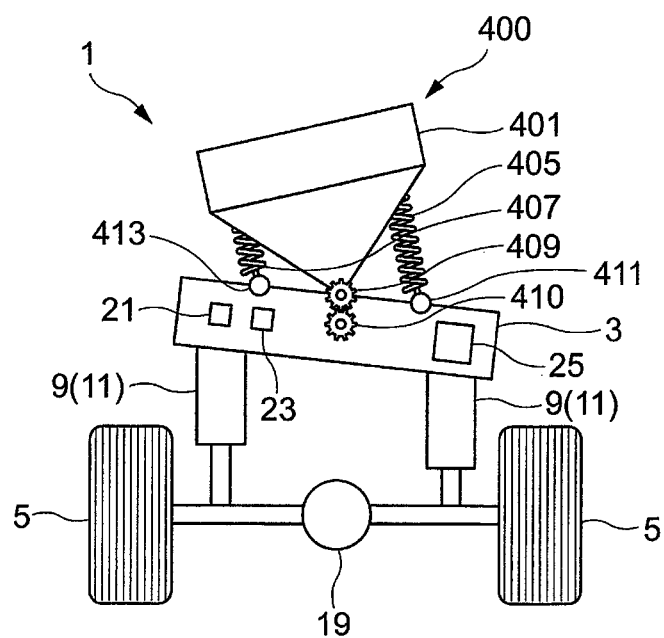
FIG. 6C is a diagram for explaining a third modification of a seating seat.

The springs 405 and 407 in the illustrated example respectively include hinges 411 and 413 at one of their ends (lower end parts in FIG. 6C). In addition, the springs 405 and 407 are rotatably supported by the vehicle body frame 3 via the hinges 411 and 413. Accordingly, angles of the springs 405 and 407 with respect to the vehicle body frame 3 are variable.

Furthermore, the driven gear 409 is fixed with respect to the seat main body 401. As the driven gear 409 rotates by being driven, the seat main body 401 also rotates around the driven gear 409.

With the seating seat 400, as the drive gear 410 performs driving, the driven gear 409 rotates and the seat main body 401 inclines in the vehicle width direction.

In addition, in the fourth modification shown in FIG. 6D, a seating seat 500 includes a seat main body 501, a guide pin 505 provided fixed to the seat main body 501 below the seat main body 501, a guide rail 507 which is fixed with respect to the vehicle body frame 3 and which guides the guide pin 505 in the vehicle width direction of the vehicle body frame 3, and a hydraulic cylinder 509 which is fixed with respect to the vehicle body frame 3 and which pushes the seat main body 501 in the vehicle width direction.

Figure 6D:
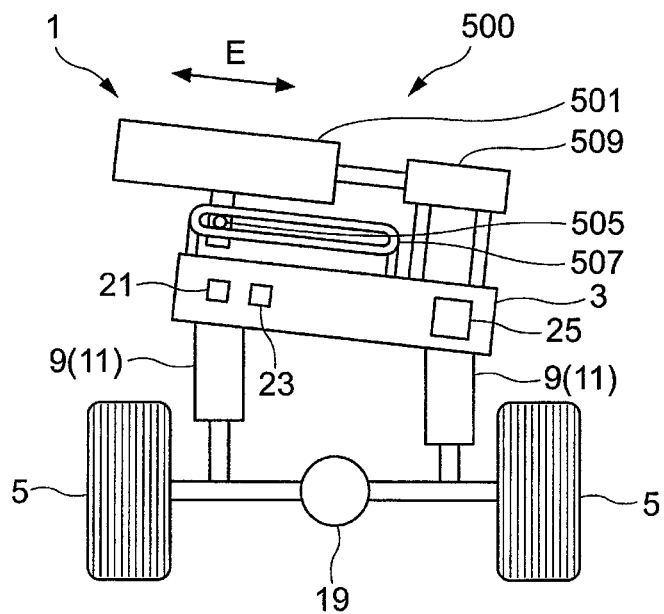
FIG. 6D is a diagram for explaining a fourth modification of a seating seat.

Furthermore, with the seating seat 500, by driving the hydraulic cylinder 509, the seat main body 501 is moved in the vehicle width direction with respect to the vehicle body frame 3 (refer to arrow E in FIG. 6D).

Moreover, in the present modification, unlike the embodiment and the modifications described earlier, an angle of the seat main body 501 with respect to the vehicle body frame 3 is not varied. However, the center of gravity of the driver 50 astride the seat main body 501 may be moved by moving the seat main body 501 in the vehicle width direction with respect to the vehicle body frame 3 as in the present modification.

<Modification 2>

Figure 7:
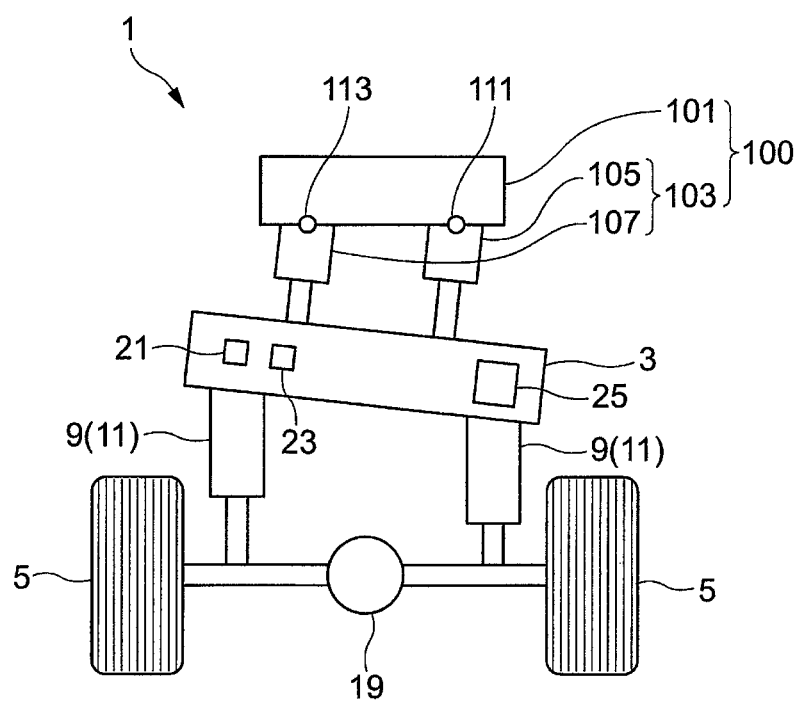
FIG. 7 is a diagram for explaining another operational example of a seating seat.

FIG. 7 is a diagram for explaining another operational example of the seating seat 100.

In the embodiment presented above, a description of inclining the seat main body 101 in the vehicle width direction by driving of the angle adjustment mechanism 103 has been given.

However, as shown in FIG. 7, the angle adjustment mechanism 103 may be driven so as to maintain an upper surface (a seat surface) of the seat main body 101 in a horizontal direction in the vehicle width direction. More specifically, while the vehicle body frame 3 inclines as though falling toward the outer side of the turning center when the straddle-type vehicle 1 is turned, the angle adjustment mechanism 103 may be driven so that the seat main body 101 provided on the vehicle body frame 3 does not incline in the vehicle width direction.

<Other>

While the front wheels 5 and the rear wheels 7 have been described as balloon tires which are special tires in the description given above, such a configuration is not restrictive. For example, it is obvious that ordinary tires including tires having a flat shape as though a surface of the tires in contact with the road surface is pushed by the road surface such as tires used by ordinary four-wheel vehicles and tires having a shape such that a portion that comes into contact with the road surface is curved so as to protrude toward the road surface such as tires used by motorcycles can also be used.

In addition, while a description of the steering angle sensor 21 and the vehicle speed sensor 23 provided as means for detecting a traveling state of the straddle-type vehicle 1 and control of an inclination of the seat main body 101 based on detection signals from these sensors has been given above, such a configuration is not restrictive. For example, it is obvious that the control of inclination of the seat main body 101 may also be performed based on detection signals or the like of a lateral G sensor that detects a lateral acceleration of the straddle-type vehicle 1, a yaw rate sensor that detects a yaw rate, a vehicle height sensor that detects a vehicle height, a sensor that detects an inclination of the seat main body 101, and the like.

Furthermore, while a description of the control device 25 deciding extension/compression amounts of the first hydraulic damper 105 and the second hydraulic damper 107 while referring to a table that defines the extension/compression amounts of the first hydraulic damper 105 and the second hydraulic damper 107 has been given above, such a configuration is not restrictive. For example, the extension/compression amounts of the first hydraulic damper 105 and the second hydraulic damper 107 may be decided as follows.

First, the control device 25 calculates (computes) a magnitude of a turning force based on a detection signal representing a detected traveling state of the straddle-type vehicle 1. Subsequently, based on the calculated turning force, an amount (a movement amount) by which the center of gravity of the driver 50 is to be moved is calculated. The extension/compression amounts of the first hydraulic damper 105 and the second hydraulic damper 107 are decided so that the calculated movement amount is produced.

With the first hydraulic damper 105 and the second hydraulic damper 107 of the angle adjustment mechanism 103, as each hydraulic damper extends/compresses, a height of the seat main body 101 varies in a region supported by the hydraulic damper. Therefore, the angle adjustment mechanism 103 can also be considered to be a height adjustment mechanism that adjusts a height of the seat main body 101.

In addition, while a configuration of the straddle-type vehicle 1 that does not include a differential device has been described above, it is obvious that a configuration including a differential device may also be adopted.

Furthermore, while a configuration in which the control device 25 is provided on the vehicle body frame 3 has been described above, a configuration in which the control device 25 is provided on the seating seat 100 may also be adopted.

Moreover, while a configuration in which the seat main body 101 is inclined in the vehicle width direction has been described above, varying the angle of the seat main body 101 with respect to the vehicle body frame 3 may suffice. For example, a configuration in which the seat main body 101 is inclined in back and forth directions may be adopted. By inclining the seat main body 101 in back and forth directions, the center of gravity of the driver 50 moves in back and forth directions and loads applied to the front wheels 5 and the rear wheels 7 are adjusted. More specifically, as a configuration for inclining the seat main body 101 in back and forth directions, for example, a configuration may be adopted in which the first hydraulic damper 105 and the second hydraulic damper 107 are provided separated from one another in the back and forth directions.

Furthermore, while a description of moving the seat main body 501 in the vehicle width direction has been given in the modification shown in FIG. 6D, a configuration may be adopted in which the seat main body 501 is moved in the back and forth directions.

Moreover, a configuration may be adopted in which the angle of the seat main body 501 with respect to the vehicle body frame 3 is varied and, at the same time, the seat main body 501 is moved in the vehicle width direction with respect to the vehicle body frame 3 or the seat main body 501 is moved in the back and forth directions with respect to the vehicle body frame 3. In addition, a configuration may be adopted in which the angle of the seat main body 501 with respect to the vehicle body frame 3 is varied and the seat main body 501 is moved in both the vehicle width direction and the back and forth directions with respect to the vehicle body frame 3.

What is claimed is:

1. A straddle-type vehicle seat comprising:
    a saddle-type seat main body which is provided above a vehicle body in one of a three-wheel straddle-type vehicle and a four-wheel straddle-type vehicle and which is straddled by a driver; and
    an angle adjustment mechanism which adjusts an angle of the saddle-type seat main body with respect to the vehicle body in accordance with a signal from a detection unit that detects a traveling state of the straddle-type vehicle when the straddle-type vehicle is turning.

2. The straddle-type vehicle seat according to claim 1, wherein the angle adjustment mechanism adjusts the angle of the saddle-type seat main body with respect to the vehicle body in accordance with an angle of a steering part steering the straddle-type vehicle and a speed of the straddle-type vehicle.

3. The straddle-type vehicle seat according to claim 1, wherein the angle adjustment mechanism adjusts the angle of the saddle-type seat main body with respect to the vehicle body so that, in the saddle-type seat main body, a side of a center of turning of the straddle-type vehicle becomes lower than an outer side of the center of turning.

4. The straddle-type vehicle seat according to claim 1, wherein the angle adjustment mechanism inclines the saddle-type seat main body in a direction opposite to a direction in which the vehicle body inclines when the straddle-type vehicle is turning.

5. The straddle-type vehicle seat according to claim 1, wherein the angle adjustment mechanism comprises a plurality of height adjustment mechanisms which are disposed below the saddle-type seat main body, and which extend and compress with upper ends thereof being connected to the saddle-type seat main body and lower ends thereof being connected to the vehicle body, and which are provided at positions that differ from one another in a vehicle width direction of the straddle-type vehicle.

6. The straddle-type vehicle seat according to claim 1, wherein the angle adjustment mechanism comprises a support part which is fixed to the vehicle body and which rotatably supports a center part of the saddle-type seat main body in a vehicle width direction of the straddle-type vehicle.

7. A straddle-type vehicle comprising:
    a vehicle body for one of a three-wheel straddle-type vehicle and a four-wheel straddle-type vehicle;
    a saddle-type seat main body which is provided above the vehicle body and which is straddled by a driver;
    a detection sensor which detects a traveling state of the straddle-type vehicle when the vehicle is turning; and
    a position adjustment mechanism which adjusts a relative position of the saddle-type seat main body with respect to the vehicle body in accordance with a signal from the detection sensor.

* * * * *